(12) United States Patent
Woods

(10) Patent No.: US 12,012,576 B2
(45) Date of Patent: Jun. 18, 2024

(54) LIQUOR FLAVOR INFUSER

(71) Applicant: Charles Woods, Plymouth, IN (US)

(72) Inventor: Charles Woods, Plymouth, IN (US)

(*) Notice: Subject to any disclaimer, the term of this patent is extended or adjusted under 35 U.S.C. 154(b) by 695 days.

(21) Appl. No.: 17/308,115

(22) Filed: May 5, 2021

(65) Prior Publication Data

US 2022/0064578 A1    Mar. 3, 2022

Related U.S. Application Data

(60) Provisional application No. 63/070,032, filed on Aug. 25, 2020.

(51) Int. Cl.
*C12G 3/06* (2006.01)
*B67D 3/00* (2006.01)

(52) U.S. Cl.
CPC .............. *C12G 3/06* (2013.01); *B67D 3/0019* (2013.01); *B67D 3/0051* (2013.01)

(58) Field of Classification Search
CPC ....... C12G 3/06; B67D 3/0019; B67D 3/0051
See application file for complete search history.

(56) References Cited

U.S. PATENT DOCUMENTS

| | | | |
|---|---|---|---|
| 9,399,197 B2* | 7/2016 | Graham | B01F 25/31242 |
| 9,486,754 B2* | 11/2016 | Foldesi, Jr. | B65D 41/348 |
| 10,052,593 B2* | 8/2018 | Min | B01F 23/236 |
| 2010/0155419 A1* | 6/2010 | Nishino | B67D 1/0802 |
| | | | 222/113 |
| 2012/0156345 A1* | 6/2012 | Agarwal | B01F 25/31242 |
| | | | 426/474 |
| 2015/0174537 A1* | 6/2015 | Foldesi, Jr. | B01F 23/2361 |
| | | | 261/79.2 |
| 2018/0016158 A1* | 1/2018 | McDonald | B67D 3/0019 |
| 2022/0204896 A1* | 6/2022 | Giildenzopf | B67D 1/0021 |
| 2022/0232859 A1* | 7/2022 | Rittenburg | A23L 2/56 |
| 2022/0356425 A1* | 11/2022 | Giildenzopf | C12G 3/06 |
| 2023/0255218 A1* | 8/2023 | Pla Cortes | A23B 4/044 |
| | | | 99/323.1 |

* cited by examiner

*Primary Examiner* — Sean M Michalski
(74) *Attorney, Agent, or Firm* — Michael D. Marston; Botkin & Hall, LLP

(57) ABSTRACT

A device for infusing flavor into liquids fits and seals to the neck of a bottle. The device has an infusing chamber that is selectively in fluid communication with the liquid in the bottle. The infusing chamber holds a replaceable infusing material that partially dissolves and infuses flavor as liquid passes over it. A check ball selectively separates the infusing chamber from the liquid in the bottle to prevent any infused liquid from returning to the bottle. The device has a passage for makeup air to enter the bottle as infused liquid is dispensed. The infusing material is replaceable by accessing the infusing chamber.

18 Claims, 3 Drawing Sheets

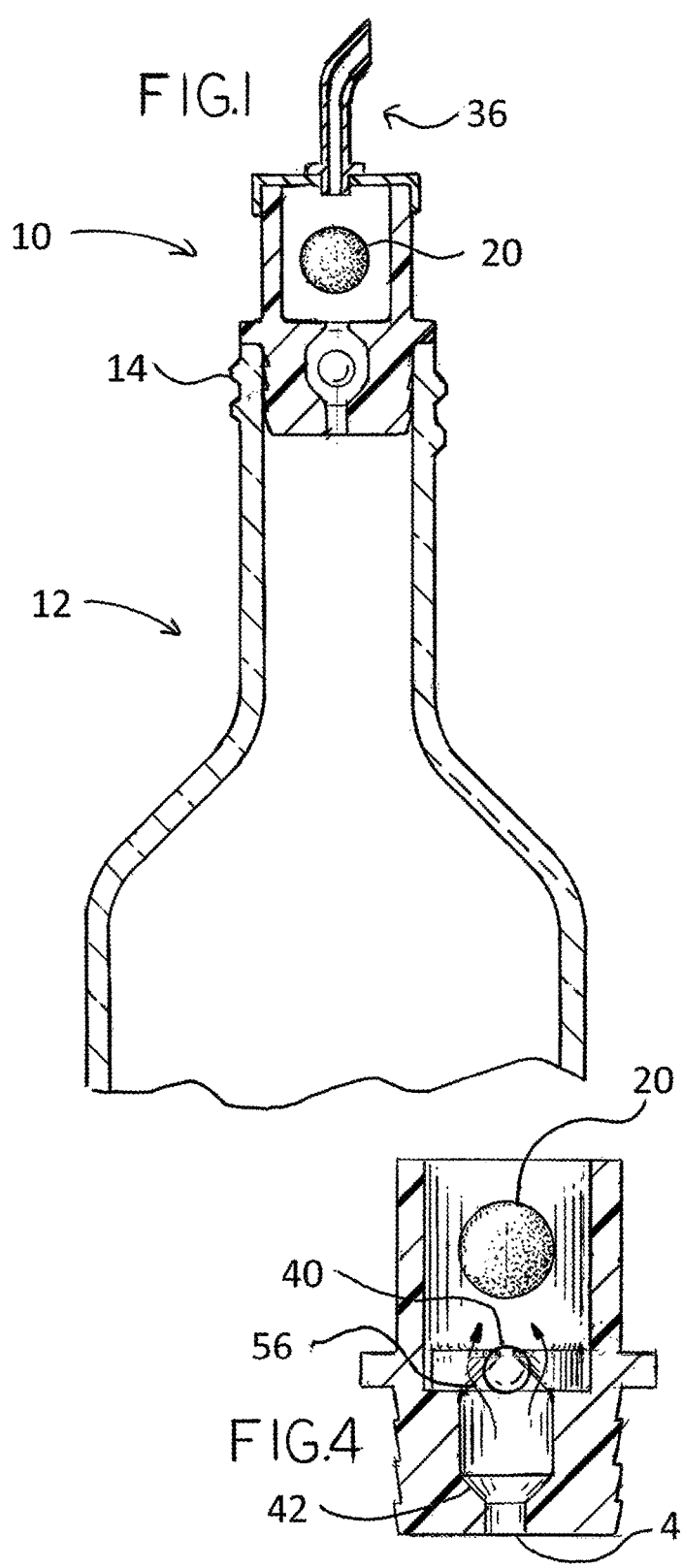
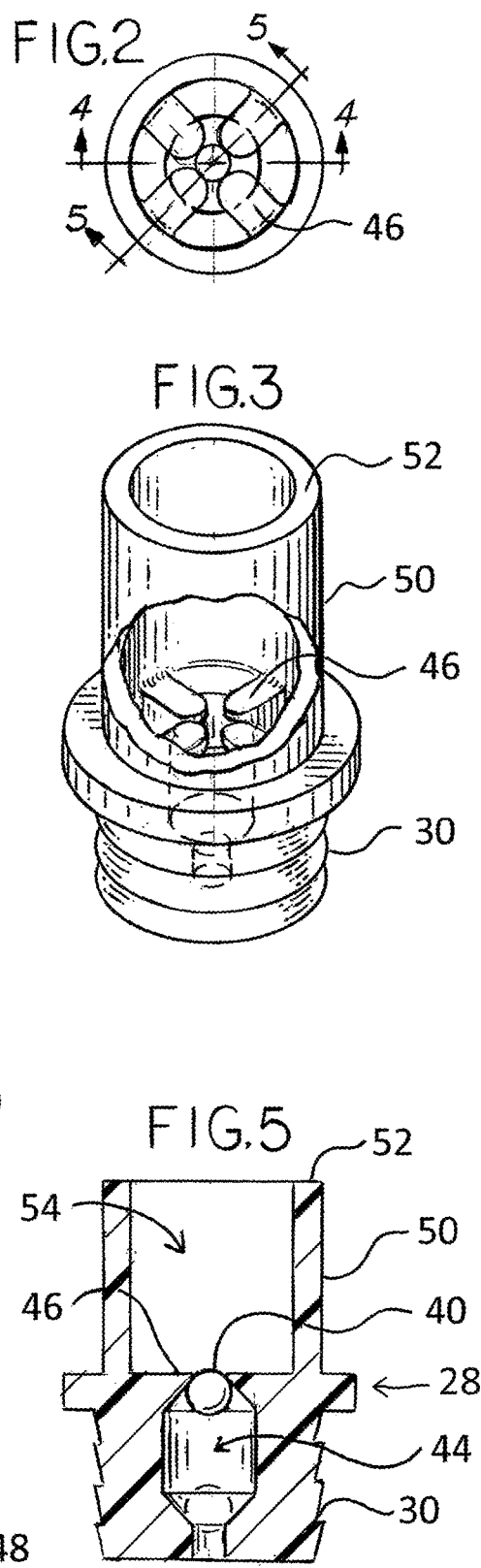

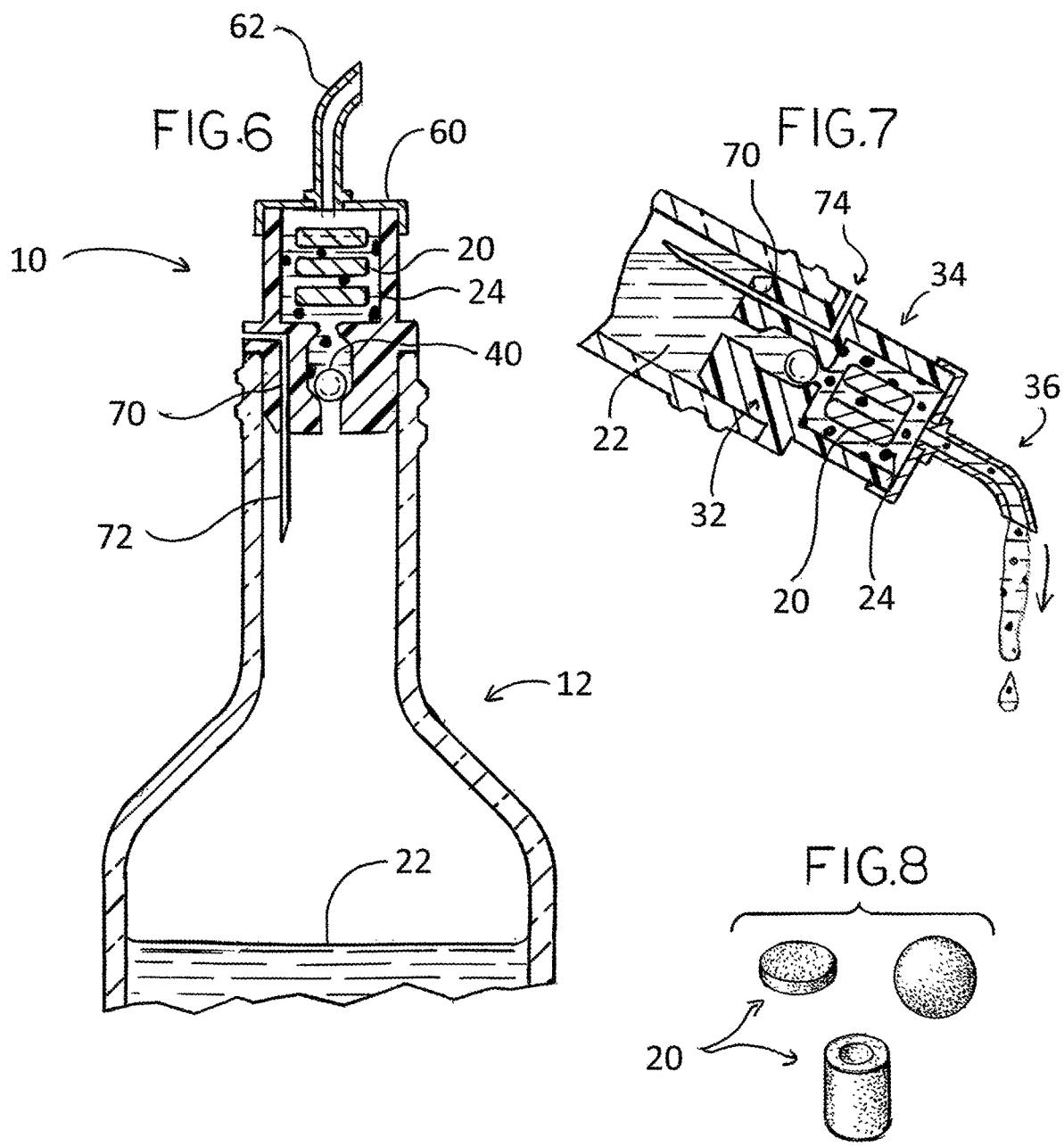

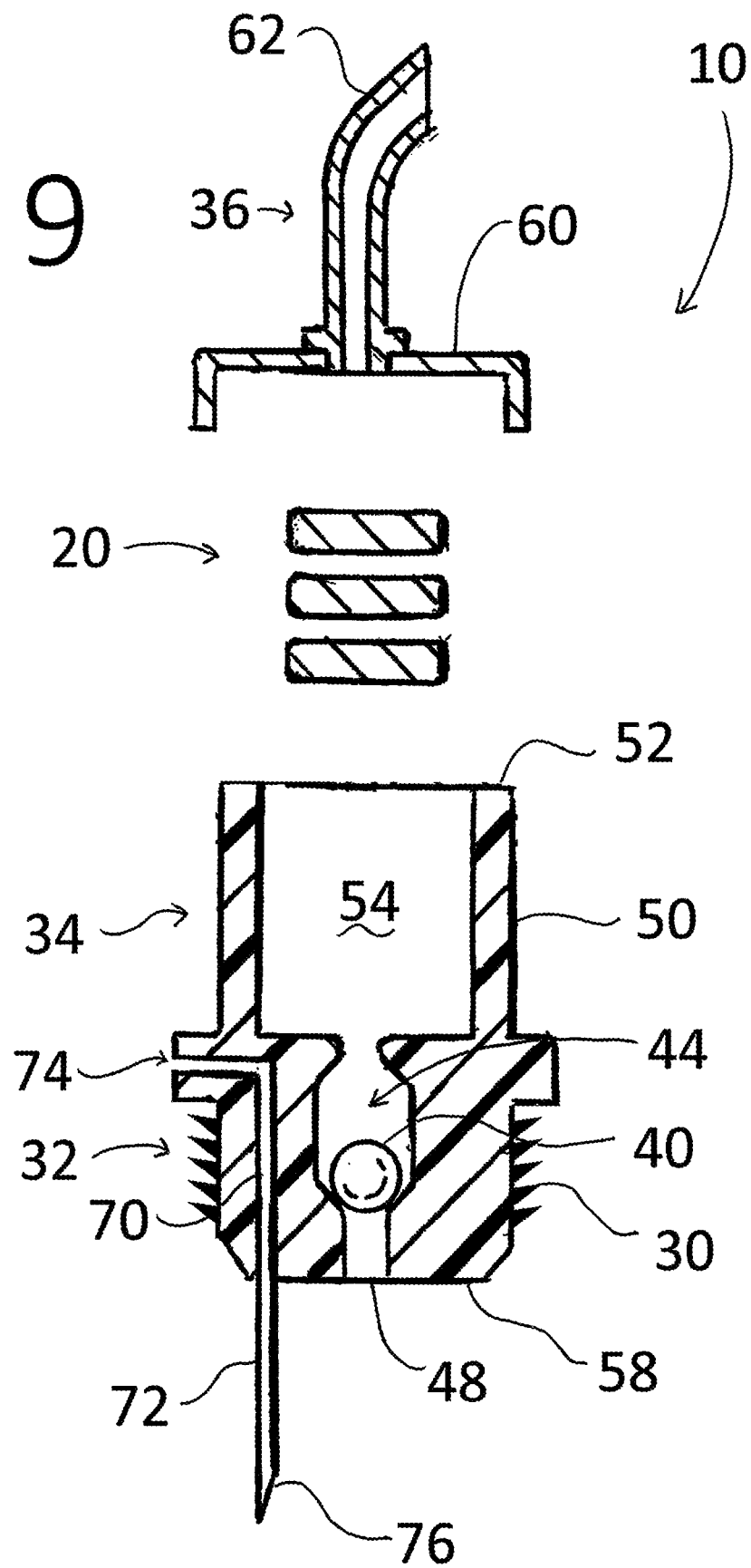

LIQUOR FLAVOR INFUSER

CROSS REFERENCE TO RELATED APPLICATIONS

This application claims the benefit of U.S. Provisional Application No. 63/070,032, filed Aug. 25, 2020, the disclosures of which are hereby incorporated by reference.

BACKGROUND OF THE INVENTION

This present disclosure relates to dispensing nozzles fitted to containers, such as liquor bottles. Many attempts to infuse liquor have been made, but require extensive amounts of time for proper mixing. Some infuse the entire container of liquid, thereby mixing an entire batch and preventing substitution of flavors. Other attempts take two different liquids and mix them, which may involve pumps, valves, or other complicated mechanisms. These require cleaning or maintenance and can be difficult to use. Other dispensers require the replacement of a significant portion of the device, creating a large source of waste when the infusing material runs out. An improved device is needed.

SUMMARY OF THE INVENTION

The present disclosure describes a dispensing nozzle that fits and seals to a bottle that holds liquid, such as liquor. The dispensing nozzle has a check ball chamber that only allows liquid to pass in one direction. The dispensing nozzle contains a flavor infusing solid that is retained in a flavor infusion chamber. When liquid passes through the infusion chamber, the liquid partially dissolves the flavor infusing solid by the passing liquid to mix with the liquid and infuse it with flavor. The check ball chamber prevents any infused liquid from returning to the bottle. The infusing solid is replaceable by removing the spout. Because the infusing occurs in the nozzle, multiple nozzles can be switched out to infuse liquid with different flavors by simply switching out the nozzle or combining multiple infusing solids into the infusion chamber.

BRIEF DESCRIPTION OF THE DRAWINGS

A preferred embodiment of this invention has been chosen wherein:

FIG. 1 is a section view of the device as installed on a liquor bottle;

FIG. 2 is a top view of the device with the spout removed;

FIG. 3 is an isometric view with a partial cutout;

FIG. 4 is a side section view 4-4 of the device in FIG. 2 with the check ball in the dispensing position;

FIG. 5 is a side section view 5-5 of the device in FIG. 2 showing the check ball in the dispensing position and the stopped position in hidden lines;

FIG. 6 is a section view of the device showing alternate infusion materials and makeup air flow path;

FIG. 7 is a section view of the device infusing and dispensing of infused liquid;

FIG. 8 are isometric views of examples of infusion materials; and

FIG. 9 is an exploded view of the device.

DESCRIPTION OF THE PREFERRED EMBODIMENT

An infusing device 10, shown in FIGS. 1-7 and 9 is designed to work with infusion materials 20, shown in FIG. 8. The device 10 fits and seals to a bottle 12 at a neck 14. The bottle 12 holds a liquid 22, shown in FIG. 6. The liquid 22 is commonly distilled liquor or spirits, but any liquid can be used. The infusion materials 20 can include a hard candy, mints, or other solid material that will at least partially dissolve in the presence of liquid 22. The amount of solubility can depend on the type of liquid intended to be used, the duration the infusion materials 20 are intended to last, or the desired intensity of infusion.

The device 10 seals to the neck 14 with resilient sealing ribs 30 that are resilient to compensate for size or surface irregularities in the neck. It is contemplated that the device 10 is made from a semi-rigid material or is made from a rigid material and the sealing ribs 30 are made from resilient materials. In either event, the sealing ribs 30 prevent leakage of the liquid 22 between the device 10 and bottle 12 during or after pouring. The device 10 is separated into three basic portions; the check valve portion 32, the infusing portion 34, and the spout portion 36, shown in FIG. 9. The sealing ribs 30 surround the check valve portion 32, which has a captured check ball 40 that moves between a sealed position, shown in FIG. 6, and a dispensing position, shown in FIG. 7. In the sealed position, the check ball 40 is against the seat 42 and held in place by gravity. The check ball 40 is captured in a check ball cavity 44 by retaining fingers 46 on the top end and the seat 42 on the bottom end. The check ball cavity 44 allows fluid flow into the opening 48 when the bottle 12 is tipped and the check ball moves away from the seat 42. As shown in FIG. 4, there are gaps 56 between the fingers 46 to allow fluid flow through the check ball cavity 44 when the check ball 40 is against the fingers 46. It is contemplated that a mesh, screen, or other device (not shown) is used to retain the check ball 40 in the check ball cavity 44 instead of or in addition to the fingers 46. The check ball 40 is made from a material that is food-safe and compatible with alcohol, water, and infusing materials 20. This includes alcohol, drinks, water, or common dispensed liquids from the bottle 12. Further, the check ball 40 is made from materials that are denser than the liquid 22. Because the check ball 40 is denser than the liquid 22, it will sink and contact the seat 42 when the bottle 12 is turned upright, even when liquid is present in the check ball cavity 44. At the top of the check valve portion 32 is a lip 28. The lip 28 prevents the device 10 from being inserted too far into the neck 14 and provides an inlet 74 which allows for makeup air to enter the bottle 12 through a makeup air passage 70.

The infusing portion 34 holds the infusion materials 20 and is located between the spout portion 36 and check valve portion 32. The infusing portion 34 has a cylindrical outer wall 50 that extends to a top edge 52. The infusing portion 34 holds the infusion materials as shown in FIGS. 1, 6, and 7. The infusing portion 34 receives and seals to the spout portion 36, which forms an infusing chamber 54. The infusion materials 20 are trapped in the infusing chamber 54 by the fingers 46 and spout portion 36. The spout portion 36 has a cover 60 and a spout 62. The cover 60 and spout 62 are joined and sealed to each other to prevent fluid leaks. The spout portion 36 is shown disconnected from the infusing portion 34 in FIG. 9, for cleaning or replacement of the infusing materials 20. The spout portion 36 connects to the outer wall 50 at the cover 60, either by a snap feature, threading, or interference fit. A seal (not shown) may be implemented to ensure a leak proof connection where the spout portion 36 connects to the outer wall 50.

The device 10 includes a makeup air passage 70 for air to enter the bottle 12 when dispensing infused liquid 24, as shown in FIG. 7. The makeup air passage 70 includes a tube 72 that extends beyond the bottom surface 58. The makeup air passage 70 has an inlet 74 that extends through the side of the check valve portion 32 and an outlet 76 at the end of the tube 72. As assembled, it is desirable that the inlet 74 faces in the opposite direction of the spout 62. While not shown, it is contemplated that the spout portion 36 is keyed to the infusing portion 34 to facilitate proper alignment of the spout 62 to the inlet 74. The spout 62 does not have to face exactly opposite of the inlet 74, but if they face in the same direction, pouring problems and leakage may occur.

In the storage position, shown in FIG. 6, no liquid is being dispensed and the check ball 40 is sealed against the seat 42. To dispense and infuse, the bottle 12 is tipped as shown in FIG. 7, which brings liquid 22 to the opening 48 and also rolls the check ball 40 away from the seat 42. As the liquid 22 passes through the infusing chamber 54, it dissolves part of the infusion materials 20, which then become mixed with the liquid 22 to form infused liquid 24. As infused liquid 24 is dispensed, makeup air enters the inlet 74 and passes through the makeup air passage 70 and out of the outlet 76. Upon completion of the pour, the bottle 12 is returned to the vertical position, leaving some infused liquid 24 in the infusing chamber 54. The check ball 40 prevents any infused liquid 24 from returning to the bottle 12, where it would have mixed with the liquid 22. Mixing infused liquid 24 into the bottle 12 could contaminate the liquid 22.

The infused liquid 24 leaves the spout 62. During use, the infusion materials 20 will eventually become depleted, requiring replacement. To replace the infusion materials, the spout portion 36 is removed and new infusion materials are added. The device 10 in the disassembled state is shown in FIG. 9.

The infusing chamber 54, and to a lesser extent, the check ball cavity 44 are able to hold a specific volume of liquid. Depending on the intensity of the infusion, it is contemplated that the volume of liquid held in the chamber 54 and cavity 44 are equal to a specific drink volume, such as a shot. By storing liquid in this manner (at least after the very first pour), the liquid will continue to be infused by the infusion materials 20, so that the amount dispensed is infused and the bottle 12 is set aside for the infusion process to begin again. It is also contemplated that the infusion materials 20 will infuse to the desired amount as the liquid 22 passes over or through them.

If the user desires to purge the infusing chamber 54 and check ball cavity 44 so no further infusion occurs, the user may place a finger or thumb over the inlet 74 near the end of the desired pour. Covering the inlet 74 prevents makeup air from entering the bottle 12 and stopping the flow of liquid 22 through the opening 48. To prevent liquid 22 from passing through the makeup air passage 70, the user will have to orient the cover 60 so the spout 62 faces in the opposite direction. This is shown in FIGS. 6 and 7. It is contemplated that the cover 60 may be keyed or contain other alignment features to ensure that the assembly of the spout portion 36 to the infusing portion 34 keeps the inlet 74 facing in the opposite direction of the spout 62.

It is contemplated that the device 10 is made partially from transparent or translucent materials, especially the outer wall 50. This provides the user a quick inspection of the infusing materials 20 and if they are becoming depleted. It is further useful if the infusing materials 20 include a colorant or dye that provides a visual indicator of the infusion intensity.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An infusing dispenser for use with a bottle having a neck and storing a liquid, said infuser comprising:
    a check valve portion having a check ball captured in a check ball cavity, said check ball movable between a sealed position defined by said check ball in sealed contact with a seat to block fluid passage from said bottle into said check ball cavity, and a dispensing position defined by said check ball away from said seat to allow fluid to pass from said bottle into said check ball cavity, said check valve portion including fingers to capture said check ball in said check ball cavity, said check ball is denser than said liquid in said bottle, said check valve portion having a makeup passage, said makeup passage extending from an inlet to an outlet, said outlet located on a tube extending beyond a bottom surface of said dispenser, said inlet is located on a lip;
    an infusing portion carrying an infusing material in an infusing chamber, said infusing chamber formed from a continuous outer wall extending from said lip on said check valve portion and terminating at a top edge, said infusing chamber in fluid communication with said check ball cavity;
    a removable spout portion having a cover and a spout, said cover sealably connected to said continuous outer wall to contain said infusing material inside said infusing chamber;
    when said infusing dispenser is mated to said bottle, said check valve portion is sealed to and partially located in said neck and said outlet of said makeup passage is located in said bottle; and
    when said liquid passes through said infusing chamber, said liquid partially dissolves said infusing material to infuse said liquid.

2. The dispenser in claim 1, wherein said infusing material includes a soluble dye to show infusion intensity.

3. The dispenser in claim 1, wherein said cover is threaded to said infusing portion.

4. The dispenser in claim 1, wherein said cover is keyed to align said spout to be facing in a direction substantially opposite of said inlet when said removable spout portion is mated to said infusing portion.

5. The dispenser in claim 1, further comprising resilient sealing ribs to seal said check valve portion to said neck.

6. An infusing dispenser for use with a bottle having a neck and storing a liquid, said infuser comprising:
    a check valve portion having a check ball captured in a check ball cavity, said check ball movable between a sealed position defined by said check ball in sealed contact with a seat, and a dispensing position defined by said check ball away from said seat, said check valve portion having a makeup passage extending from an inlet to an outlet, said inlet is located on a lip;
    an infusing portion carrying an infusing material in an infusing chamber, said infusing chamber extending from said lip on said check valve portion and terminating at a top edge, said infusing chamber in fluid communication with said check ball cavity;
    a removable spout portion having a cover and a spout, said cover sealably connected to said infusing portion, said spout in fluid communication with said infusing chamber;

when said infusing dispenser is mated to said bottle, said check valve portion is sealed to and partially located in said neck and said outlet of said makeup passage located in said bottle; and when said liquid passes through said infusing chamber, said liquid partially dissolves said infusing material to form infused liquid.

7. The dispenser in claim 6, wherein said check ball selectively blocks fluid passage between said bottle and said check ball cavity.

8. The dispenser in claim 6, wherein said infusing material includes a soluble dye to show infusion intensity.

9. The dispenser in claim 6, wherein said check valve portion includes fingers to capture said check ball in said check ball cavity.

10. The dispenser in claim 6, wherein said makeup passage includes a tube that extends beyond a bottom surface of said dispenser, said outlet located at a terminal end of said tube.

11. The dispenser in claim 6, wherein said cover is threaded to said infusing portion.

12. The dispenser in claim 6, wherein said cover is keyed to align said spout to be facing in a direction substantially opposite of said inlet.

13. The dispenser in claim 6, further comprising resilient sealing ribs to seal said dispenser to said neck.

14. An infusing dispenser for use with a bottle having a liquid, said infuser comprising:

a check valve portion having a captured check ball, said check ball movable between a sealed position defined by said check ball in sealed contact with a seat and blocking fluid flow between a check ball cavity and said bottle, and a dispensing position defined by said check ball away from said seat to allow fluid to pass from said bottle into said check ball cavity;

an infusing portion for carrying infusing material in an infusing chamber, said infusing chamber in fluid communication with said check ball cavity;

a removable spout portion sealably connected to said infusing portion to contain said infusing material;

when said liquid passes through said infusing chamber, said liquid dissolves a portion of said infusing material to form infused liquid.

15. The dispenser in claim 13, wherein said infusing material includes a soluble dye to show infusion intensity.

16. The dispenser in claim 13, wherein said cover is threaded to said infusing portion.

17. The dispenser in claim 13, wherein said cover is keyed to align said spout to be facing in a direction substantially opposite of said inlet.

18. The dispenser in claim 13, further comprising resilient sealing ribs to seal said check valve portion to said neck.

* * * * *